(12) United States Patent
Greeley et al.

(10) Patent No.: US 9,020,644 B2
(45) Date of Patent: Apr. 28, 2015

(54) PISTOL-GRIP FOR INTUITIVE CONTROL OF A ROBOTIC OR VIRTUAL HAND

(75) Inventors: Daniel Greeley, Andover, MA (US);
Daniel Fourie, San Jose, CA (US);
Bryce Lee, Blacksburg, VA (US);
Yevgeniy Kozlenko, Danbury, CT (US);
David Wilkinson, Dedham, MA (US);
William T. Townsend, Weston, MA (US)

(73) Assignee: Barrett Technology, Inc., Newton, MA (US)

( * ) Notice: Subject to any disclaimer, the term of this patent is extended or adjusted under 35 U.S.C. 154(b) by 512 days.

(21) Appl. No.: 13/208,090

(22) Filed: Aug. 11, 2011

(65) Prior Publication Data

US 2012/0041595 A1 Feb. 16, 2012

Related U.S. Application Data

(60) Provisional application No. 61/401,432, filed on Aug. 11, 2010.

(51) Int. Cl.
*B25J 13/02* (2006.01)
*B25J 13/04* (2006.01)
*B25J 3/04* (2006.01)
*H01H 9/06* (2006.01)

(52) U.S. Cl.
CPC .. *B25J 13/02* (2013.01); *B25J 3/04* (2013.01); *B25J 13/025* (2013.01); *H01H 9/06* (2013.01)

(58) Field of Classification Search
USPC ............. 74/471 XY; 700/264, 245, 250, 257; 901/4; 345/161
See application file for complete search history.

(56) References Cited

U.S. PATENT DOCUMENTS

| | | | |
|---|---|---|---|
| 4,016,775 A | 4/1977 | Carlson | |
| 4,516,939 A | 5/1985 | Crimmins, Jr. | |
| 4,580,006 A * | 4/1986 | Hull | 178/18.01 |
| 4,795,296 A | 1/1989 | Jau | |
| 4,905,001 A | 2/1990 | Penner | |
| 4,909,514 A | 3/1990 | Tano | |
| 4,957,320 A * | 9/1990 | Ulrich | 294/106 |
| 5,193,963 A | 3/1993 | McAffee et al. | |
| D362,693 S | 9/1995 | Carter et al. | |
| 5,552,782 A | 9/1996 | Horn | |
| 5,675,138 A | 10/1997 | La | |
| 5,764,164 A | 6/1998 | Cartabiano et al. | |
| 5,796,354 A | 8/1998 | Cartabiano et al. | |
| 5,976,121 A | 11/1999 | Matern et al. | |
| D419,629 S | 1/2000 | Tamaribuchi | |
| 6,184,868 B1 | 2/2001 | Shahoian et al. | |

(Continued)

*Primary Examiner* — David M Fenstermacher
*Assistant Examiner* — Emily Cheng
(74) *Attorney, Agent, or Firm* — Pandiscio & Pandisico

(57) ABSTRACT

An end effector controller that is gripped by an operator in one hand, including a pistol-grip housing configured to fit in the palm of an operator's hand when gripped and having mounted thereon a plurality of switching mechanisms with pivoting, dual-acting switch triggers each configured for independent actuation by multiple fingers of the hand when said controller is gripped, and a method for controlling a robotic end effector remotely using the operator hand-gripped controller, the method including switching between preset operating modes of the end effector using a single, control input element, easily actuated by a finger in the operator's gripping hand; and providing continuous fine adjustment between preset modes using a second, control input element also easily actuated by a finger on the operator's gripping hand.

18 Claims, 12 Drawing Sheets

(56) References Cited

U.S. PATENT DOCUMENTS

| | | |
|---|---|---|
| 6,338,485 B1 | 1/2002 | Huettlinger |
| 6,344,062 B1 | 2/2002 | Abboudi et al. |
| 6,500,188 B2 | 12/2002 | Harper et al. |
| 6,893,320 B2 * | 5/2005 | Caiozza .................. 446/456 |
| 7,042,438 B2 | 5/2006 | McRae et al. |
| 7,168,748 B2 | 1/2007 | Townsend et al. |
| 7,623,945 B2 | 11/2009 | Kraft |
| 2002/0163495 A1 | 11/2002 | Doynov |
| 2005/0288551 A1 | 12/2005 | Callister et al. |
| 2006/0033462 A1 * | 2/2006 | Moridaira ................ 318/568.12 |
| 2006/0190027 A1 | 8/2006 | Downey |
| 2006/0229034 A1 | 10/2006 | Gizis et al. |
| 2007/0243933 A1 | 10/2007 | Cheng |
| 2008/0030460 A1 * | 2/2008 | Hildreth et al. ............... 345/156 |
| 2009/0289591 A1 * | 11/2009 | Kassow et al. ............ 318/568.13 |
| 2011/0018803 A1 * | 1/2011 | Underkoffler et al. ........ 345/158 |

* cited by examiner

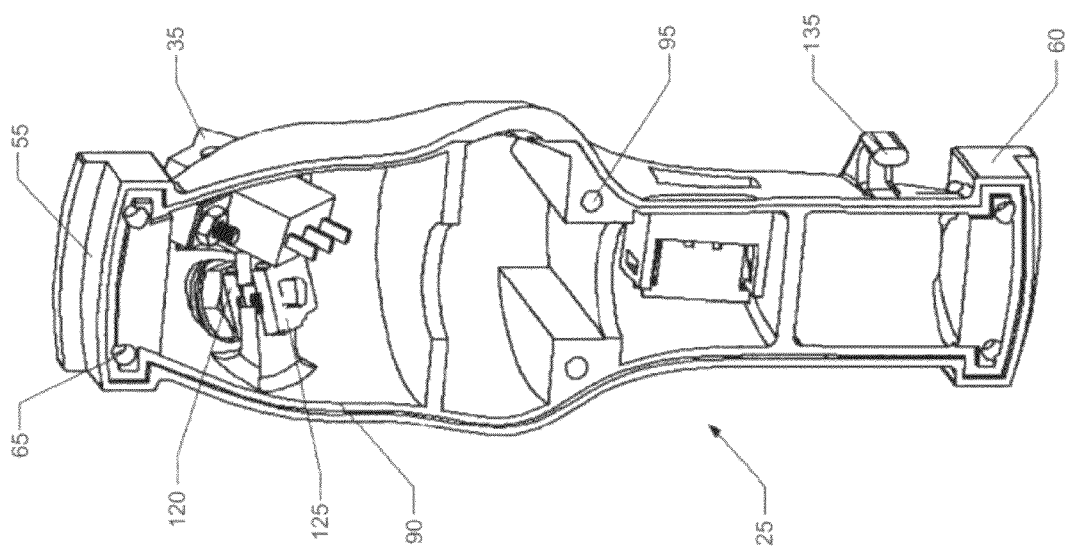

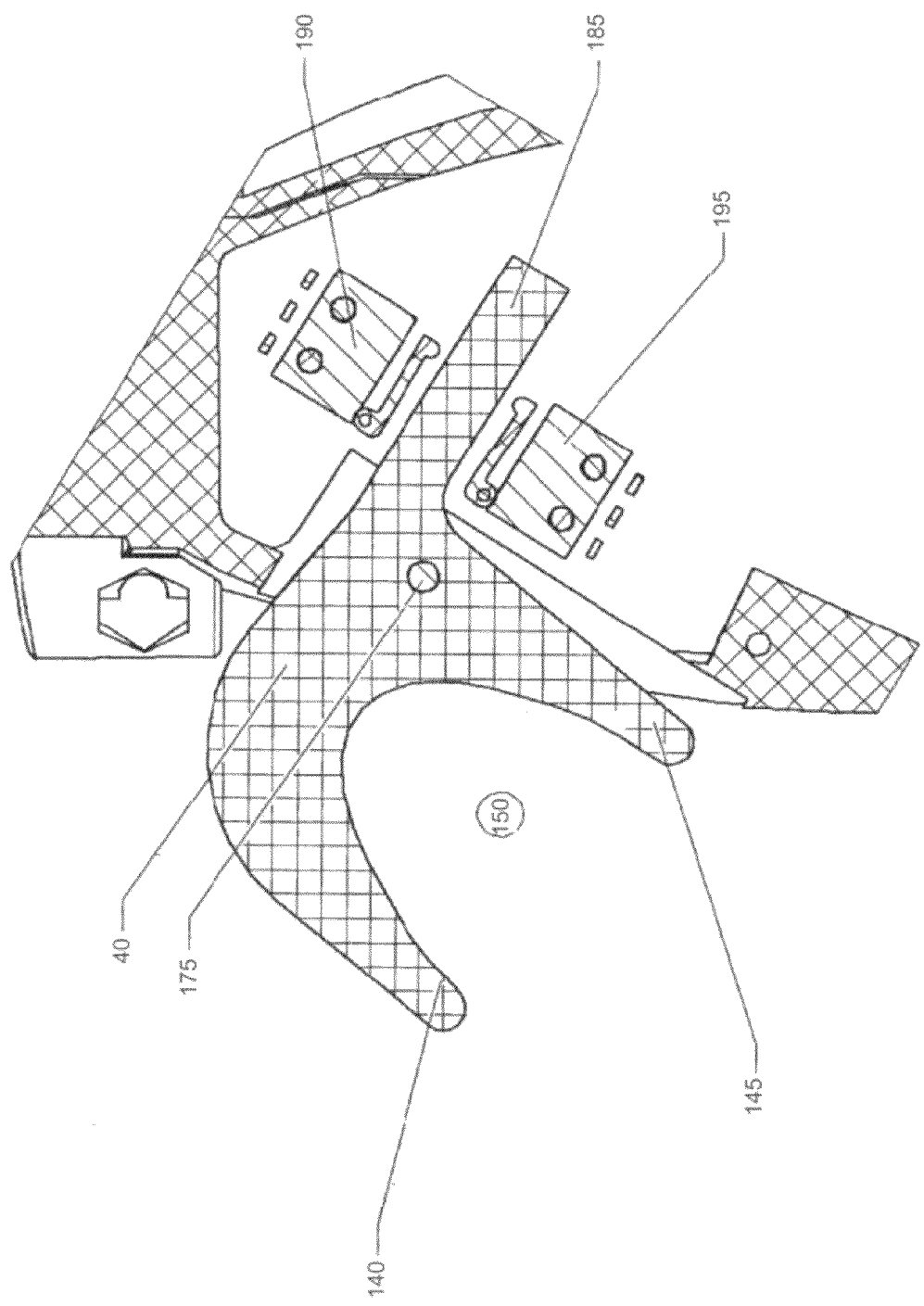

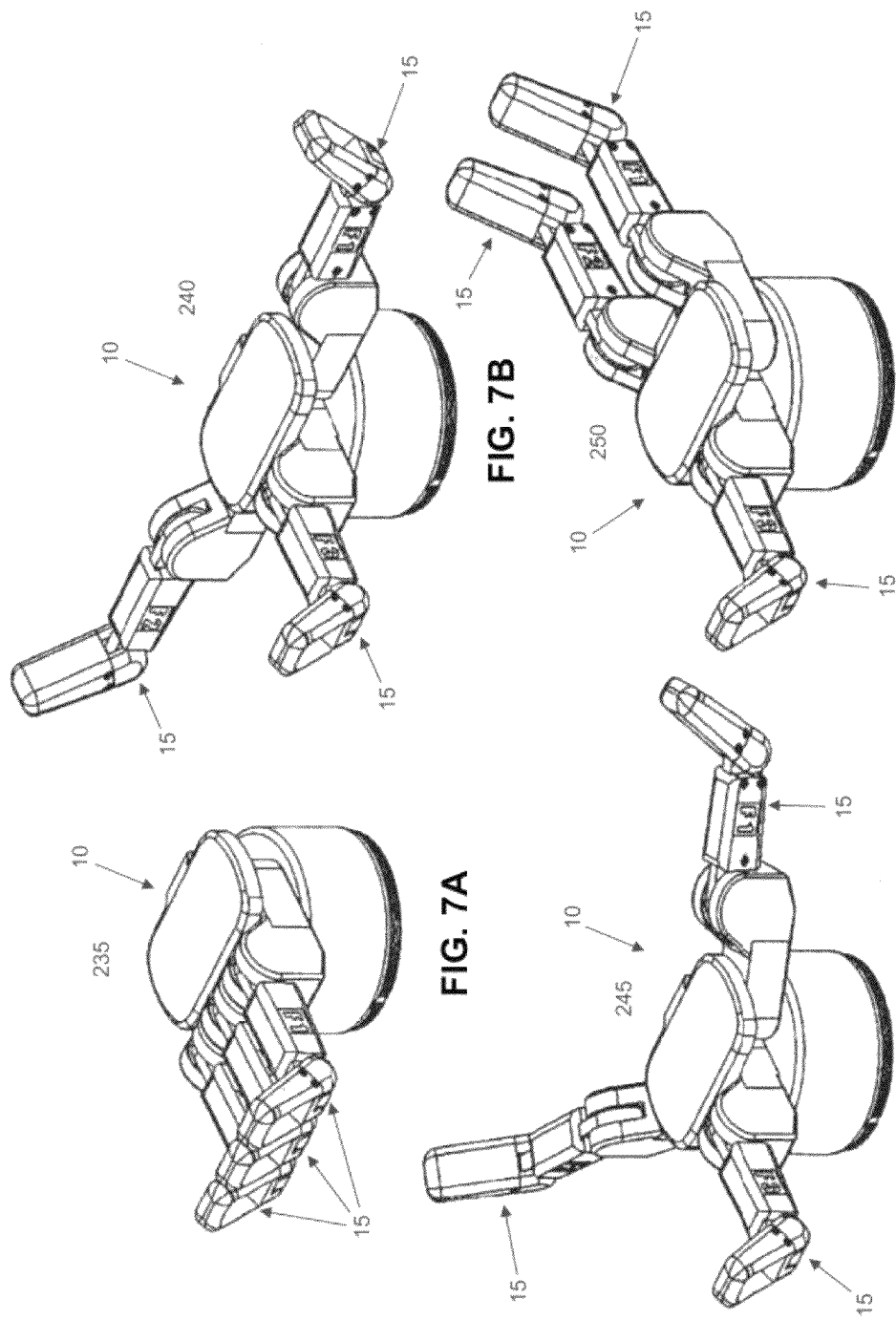

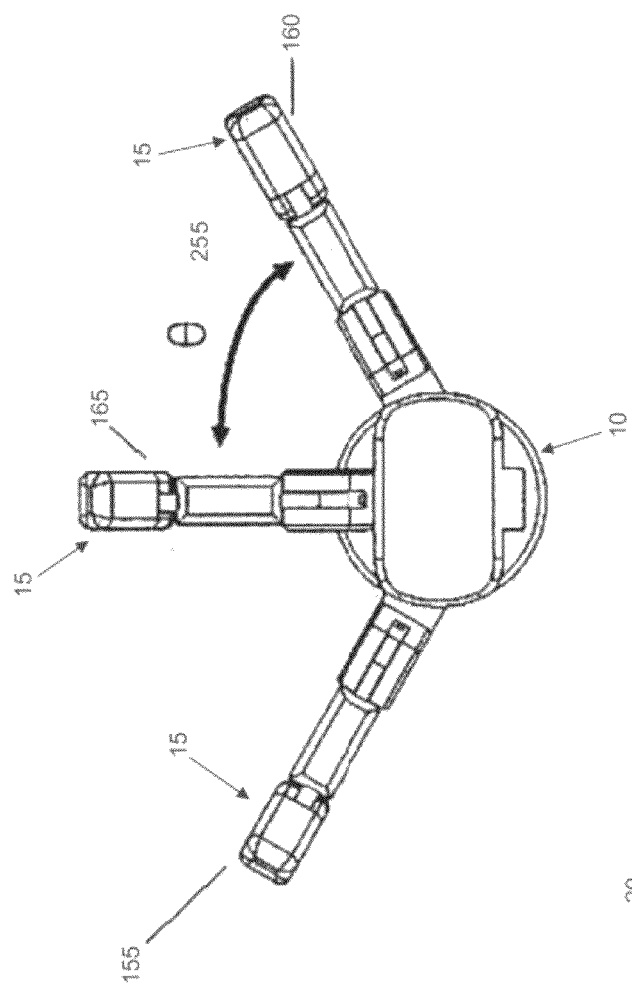
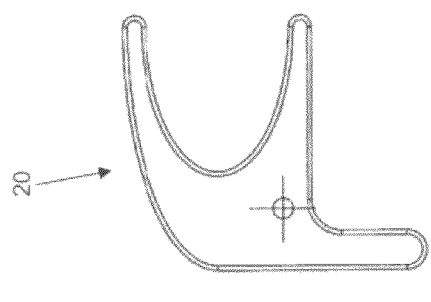
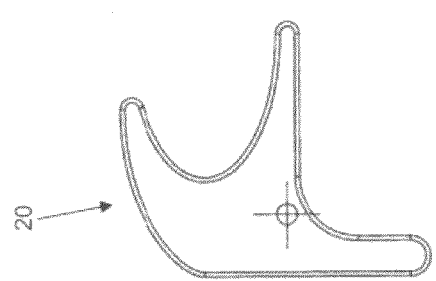
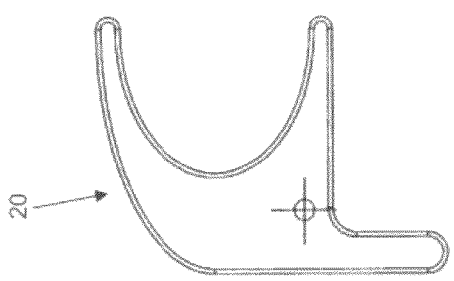

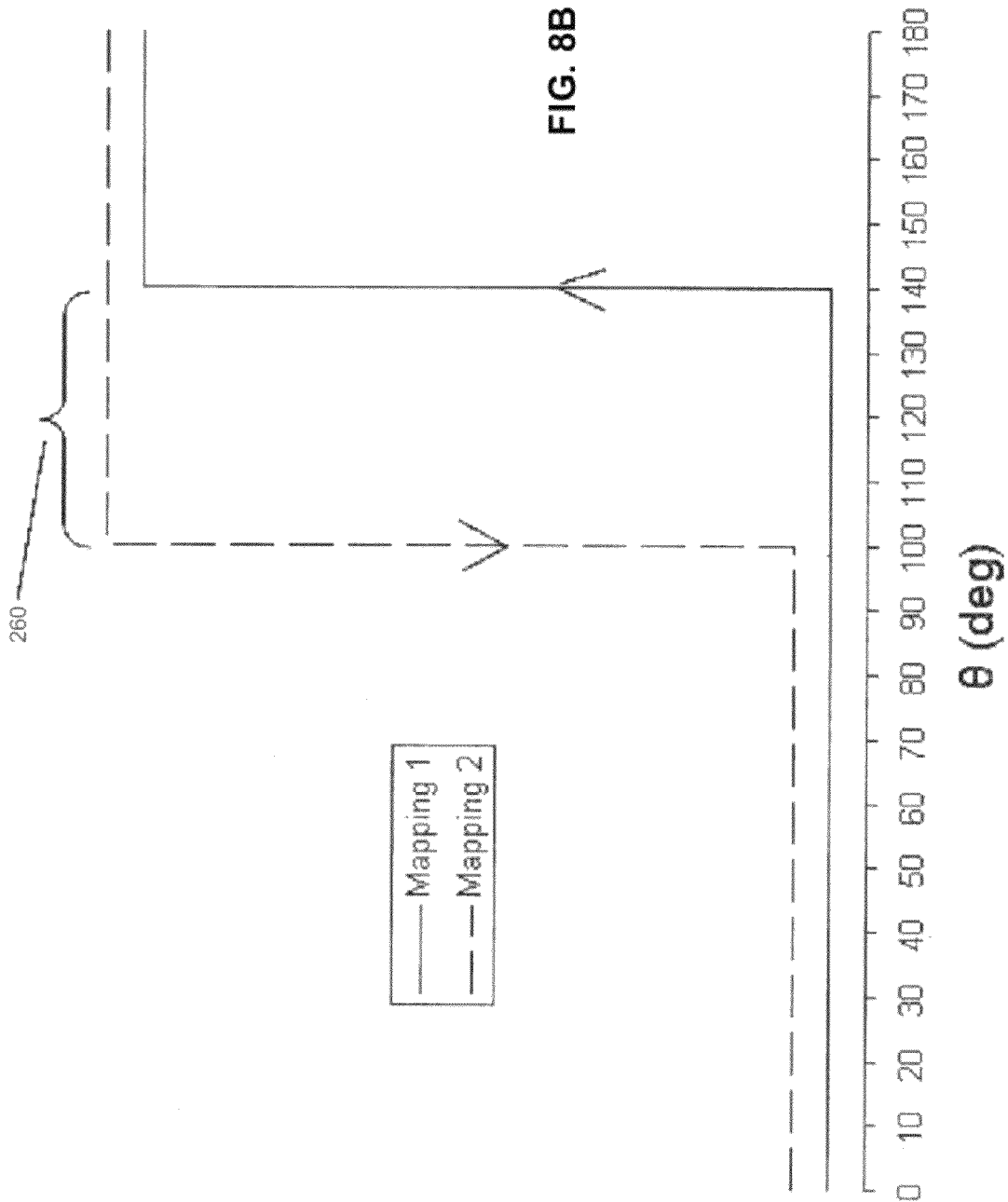

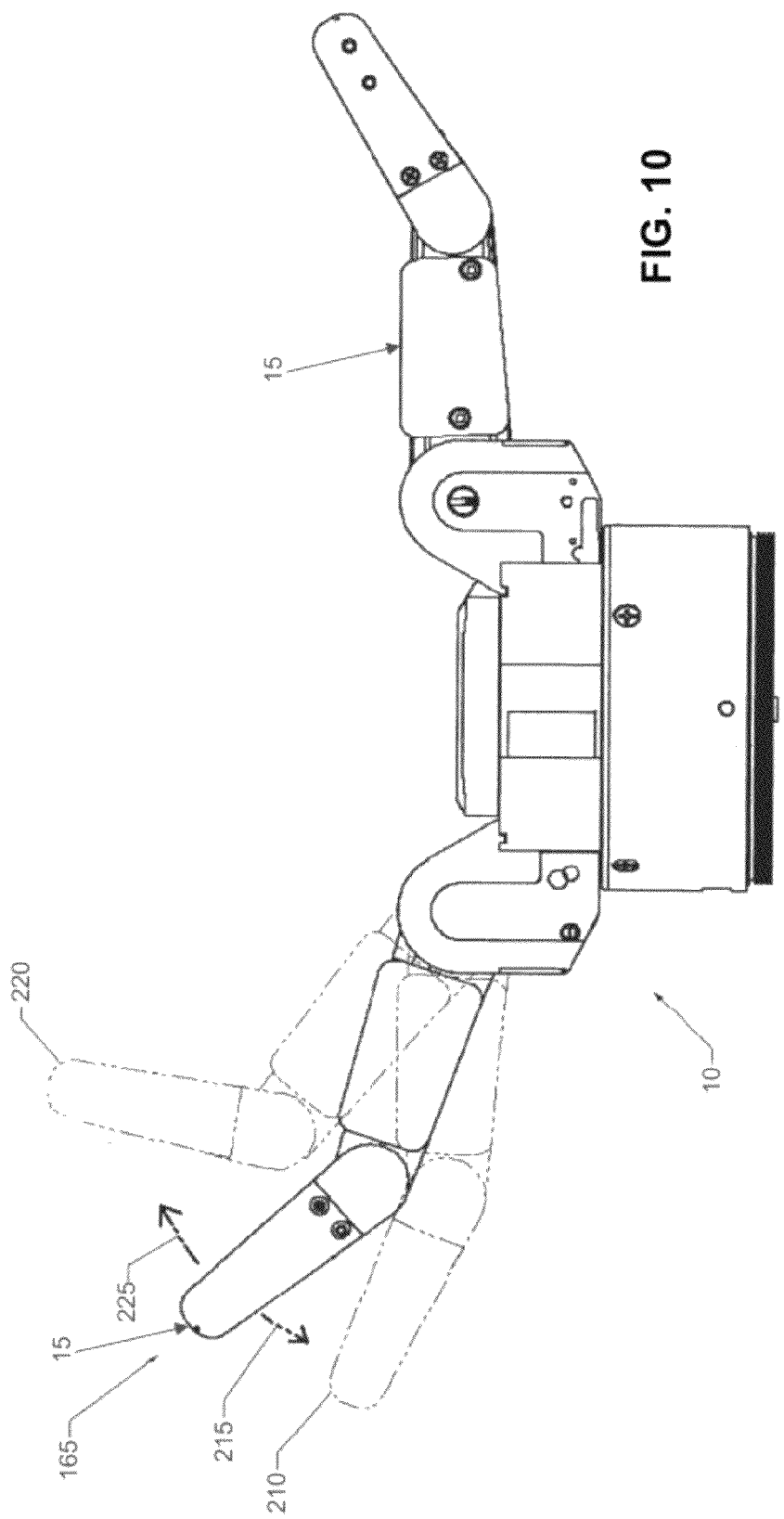

PISTOL-GRIP FOR INTUITIVE CONTROL OF A ROBOTIC OR VIRTUAL HAND

REFERENCE TO PENDING PRIOR PATENT APPLICATION

This patent application claims benefit of prior U.S. Provisional Patent Application Ser. No. 61/401,432, filed Aug. 11, 2010 by Daniel Greeley et al. for PISTOL-GRIP FOR INTUITIVE CONTROL OF A ROBOTIC OR VIRTUAL HAND, which patent application is hereby incorporated herein by reference.

FIELD OF THE INVENTION

The present invention relates to controllers for teleoperating end effectors in real and virtual environments. More particularly, the present invention relates to a pistol-grip controller that comfortably and intuitively translates movement of a user-gripped controller into corresponding movements of an end effector and wherein the actuation of switches on the controller logically maps to different functionalities on an end effector.

BACKGROUND OF THE INVENTION

Currently, a variety of pistol-grip controllers exist for robotic end effectors. These controllers exist in many shapes, from joysticks to gloves, and with a variety of number and type of switching mechanisms. One type of known controller presents one or more discrete button switches or the like on a keypad or the like, to produce a desired action of the end effector. Another type of controller designed for a more intuitive control couples the controls to the user's hand by means of a glove or Velcro® straps. A drawback of such glove and strap-on devices is that they are not readily placed on the hand ("donned") or removed from the operator's hand ("doffed").

As one example, Penner, U.S. Pat. No. 4,905,001, discloses several different pistol-grip switch configurations that function as keyboard input devices. In one embodiment, the grip is designed to fit in an operator's hand while allowing each finger to actuate switches independently. Each finger actuates opposing switches using its proximal, nearest-to-palm, and distal, farthest-from-palm, segments or phalanges.

Shahoian et al., U.S. Pat. No. 6,184,868, describes a haptic feedback controller to control a parallel-jaw end effector remotely. The single button on the controller commands the position of the jaws. The controller also provides haptic feedback to the operator when the jaws grasp an object. This controller attaches to the end of a master arm that positions the arm to which the parallel jaws are attached.

Kraft, U.S. Pat. No. 7,623,945, describes a pistol-grip controller to mount onto a back-drivable robotic arm to teleoperate another arm with an end effector. The controller handle is curved to better fit an operator's hand. It also contains several switches accessible to the thumb. The types of switches are reconfigurable, but their thumb-accessible location remains the same.

Harper et al., U.S. Pat. No. 6,500,188, presents an ultrasonic surgery tool handle that has a single dual-action switch to control the opening and closing of a clamp arm of the instrument. The switch to control the clamp is mechanically linked to the clamp. It uses an up and down actuation to open and close the clamp. A thimble-shaped cavity allows for a finger to enter and actuate the switch. The switch must be actuated using the tip of the finger. Because the switch is mechanically linked to the clamp, the switch must stay depressed for the clamp to remain closed.

Gizis et al., U.S. Pub. No. US 2006/0229034 A1, created a remote-controlled-car controller with a dual-action trigger to govern the speed of the car. The pistol-grip controller has a trigger engaged by the pointer finger. The switch can be pulled towards or pushed away from the grip.

SUMMARY OF THE INVENTION

The present invention comprises the provision and use of an ergonomic, pistol-grip controller for the single-handed operation of a real or virtual end effector, e.g., a robotic hand with plural movable multi-link fingers. The controller includes a plurality of switching mechanisms, each with a preferably "C" or hook-shaped trigger exterior at the exterior of the controller. The controller also has hysteretic remapping of the switches based on end effector orientations, e.g., the angular spread relationship of the fingers. The "C" or hook-shaped switch triggers do not confine the operator's fingers, and thus enable the operator to grasp (don) and release (doff) the controller easily.

This controller provides an intuitive interface that enables even new operators to control an end effector (e.g., a robotic hand) effectively. In order to make the controller intuitive, the switches are operated by the natural flexion and extension of the operator's distal finger segments (tips). The operator's fingers slip into the curved triggers of the switching mechanisms. Movement of the operator's fingertip pivots the enclosing trigger and a lever arm portion of the trigger inside the shell of a controller housing. This pivoting of the lever arm presses it, alternately, on one of two snap action switches mounted above and below the lever arm. It is not possible to actuate both switches at the same time. Flexion of the operator's finger causes one switch to depress and actuate while extension causes the other switch to depress and actuate.

The operator selects among commonly used configurations (e.g., finger spread angles) of the end effector through a mode-selecting toggle switch on the controller. A fine-tuning knob on the controller adjusts the spread angles of the end effector fingers between the commonly-used, preset modes. Based on the configuration of the end effector, the controller automatically changes the mapping of each switching mechanism to the appropriate end effector peripherals (e.g., fingers where the end effector is a robotic hand). The finger mapping change facilitates intuitive control of the end effector peripherals. Depending on the orientation of the end effector peripherals, it is more natural for the operator's fingers to control different permutations of end effector functions. A hysteretic transition between the switching mechanism mappings controls operator confusion as the operator adjusts between the commonly used modes of the end effector.

The present invention makes improvements to switch selection, ease of use, and controller functionality. The present invention also uses a dual-action switching mechanism to eliminate the need for opposing switch pairs on the controller exterior. The operator actuates the above-described switches by opening and closing his or her hand, a motion that is intuitive for grasping and releasing objects. The dual-action switching mechanisms in the present invention have open endings. The finger of the operator passes through the hook-shaped trigger, allowing for operators with small and large hands to use the same pistol-grip controller.

The present invention also uses a plurality of switches, allowing for the control of higher-functionality end effectors, e.g., ones with multiple modes of operation. The multiple dual-action switches of the present invention are also manipulated by multiple fingers of the operator. These switches on a pistol-grip controller are more intuitive for grasping and releasing. This also allows the operator to control several functions on the end effector simultaneously.

The controller of the present invention is not mechanically linked to the end effector. As a result, it can be used to control several different real and virtual end effectors.

In one preferred form of the invention, there is provided an end effector controller that is gripped by an operator in one hand, comprising:

a pistol-grip housing configured to fit in the palm of an operator's hand when gripped and having mounted thereon a plurality of switching mechanisms with pivoting, dual-acting switch triggers each configured for independent actuation by multiple fingers of the hand when said controller is gripped.

In another preferred form of the invention, there is provided a method for controlling a robotic end effector remotely using an operator hand-gripped controller, the method comprising:

switching between preset operating modes of the end effector using a single, control input element, easily actuated by a finger in the operator's gripping hand; and providing continuous fine adjustment between preset modes using a second, control input element also easily actuated by a finger on the operator's gripping hand.

In another preferred form of the invention, there is provided a controller that is gripped by an operator in one hand, comprising:

a pistol-grip housing configured to fit in the palm of an operator's hand when gripped and having mounted thereon a plurality of switching mechanisms with pivoting, dual-acting switch triggers each configured for independent actuation by multiple fingers of the hand when said controller is gripped.

In another preferred form of the invention, there is provided a method for controlling a device remotely using an operator hand-gripped controller, the method comprising:

switching between preset operating modes of the device using a single, control input element, easily actuated by a finger in the operator's gripping hand; and providing continuous fine adjustment between preset modes using a second, control input element also easily actuated by a finger on the operator's gripping hand.

BRIEF DESCRIPTION OF THE DRAWINGS

These and other features of the present invention will be more fully disclosed or rendered obvious by the following detailed description of the preferred embodiments of the invention, which is to be considered together with the accompanying drawings wherein like numbers refer to like parts, and further wherein:

FIG. 4 is a perspective view of the inside of the rear portion of the pistol-grip end effector controller;

FIG. 5A is a cross-sectional view of a switch trigger and its associated housing;

FIGS. 7A-7D show four preset modes or orientations of a robotic hand end effector controlled using the controller shown in FIGS. 1-6;

FIG. 8A is a robotic hand end effector as shown in FIGS. 7A-7D with two arms pivoted through a spread angle θ degrees from a third fixed arm;

FIG. 8B is a diagram illustrating a proposed hysteresis of the finger remapping the robotic hand end effector;

FIGS. 9A-9C are views in side elevation of three dual-action switch triggers shown in FIGS. 1-6; and FIG. 10 is a view in side elevation of a robotic hand end effector showing a finger in a typical position and in phantom, more closed and more open positions.

DETAILED DESCRIPTION OF THE PREFERRED EMBODIMENTS

Figure 1:
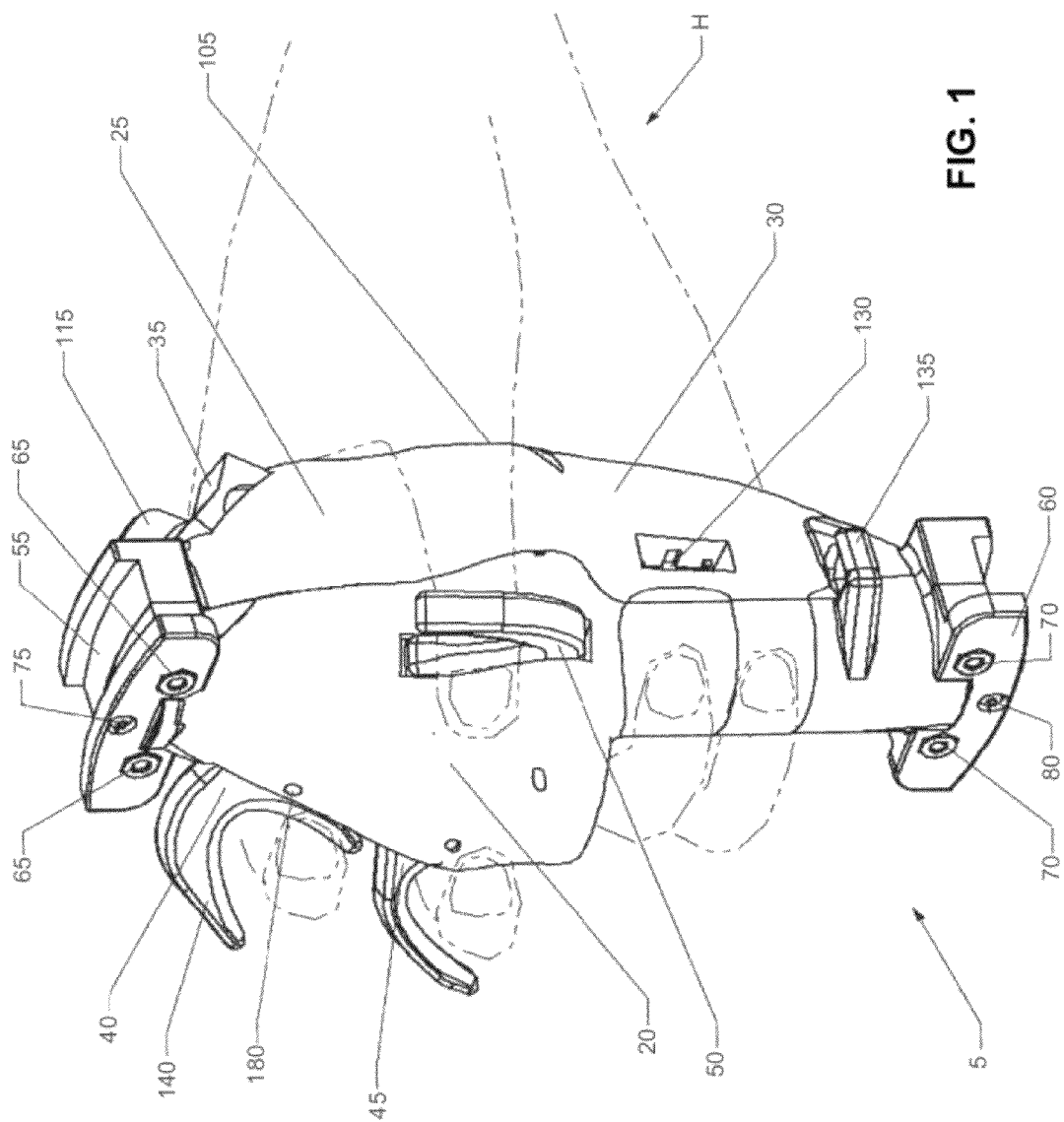
FIG. 1 is a front perspective view of a pistol-grip end effector controller formed in accordance with the present invention.

In accordance with the present invention, there is provided a controller 5 (FIGS. 1 and 2) which can be used with a robotic end effector 10 (FIGS. 7A-7D) such as a multi-fingered robotic hand of the type sold by Barrett Technology, Inc. of Cambridge, Mass. under the trade designations "Barrett Hand" and "BH8", and/or described, in one form, in U.S. Pat. No. 7,168,748 and sold by Barrett Technology, Inc. under the trade designation "Wraptor." The controller 5 controls the movement of the robotic end effector 10, including the fingers 15 (FIGS. 7A-7D) of the end effector in response to movement of the operator's fingers ("fingers" as used herein includes the thumb). The controller 5 has a "front" housing portion 20 (FIG. 1) and a "back" housing portion 25 (FIG. 2). These two housing portions are hollow, forming a shell-like housing 30 (FIG. 2) to house electronics and manually-operated switches 35, 40, 45 and 50 (FIG. 1) that each project from the outer surface of the housing 30. The housing portions 20 and 25 are preferably formed of ABS plastic, each manufactured as a single piece by a stereolithography process. Other materials and manufacturing processes can be used.

Figure 2:
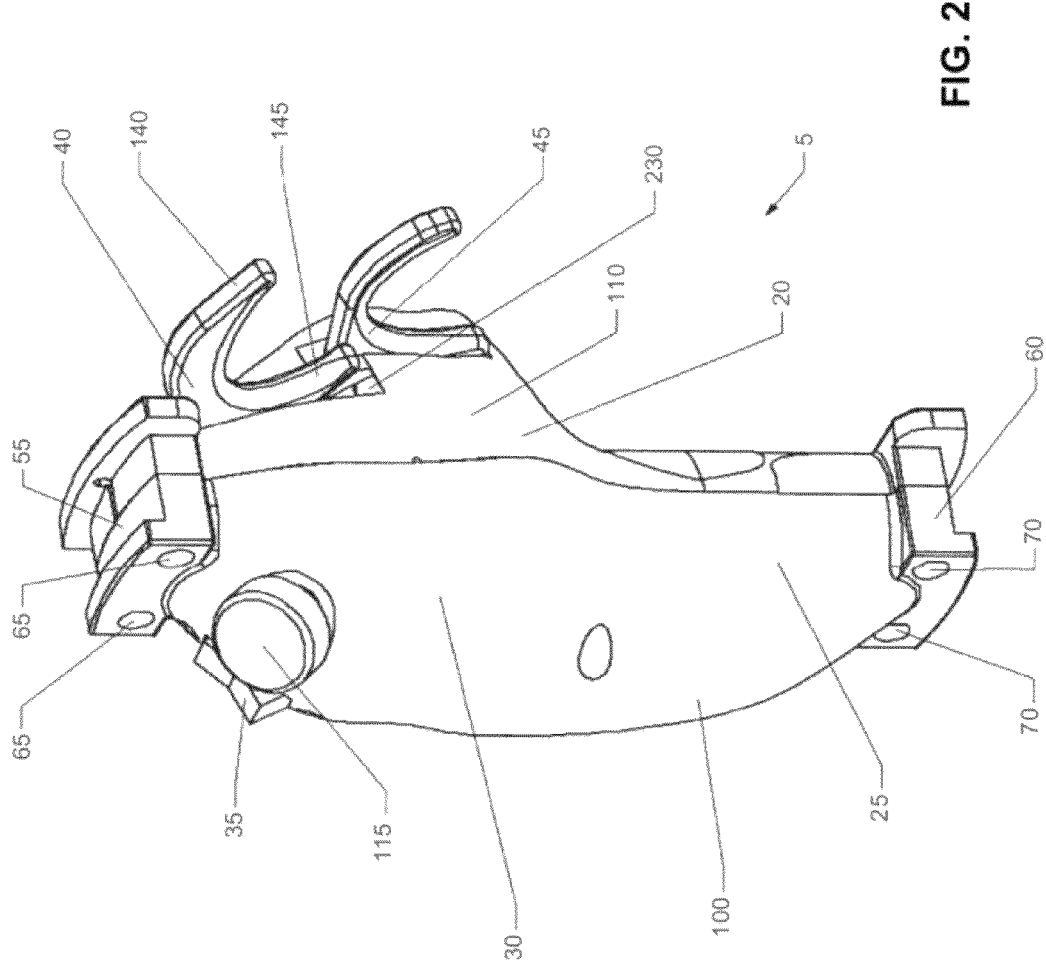
FIG. 2 is a rear perspective view of the same pistol-grip end effector controller.

The controller 5 reversibly attaches to a support (not shown) at its top end 55 (FIG. 1) and bottom end 60 (FIG. 1). Two fasteners 65 (FIG. 1) at the top, and two fasteners 70 (FIG. 1) at the bottom, provide a clamping force to anchor the controller to the support. The support is preferably a robotic multi-link arm such as the one sold by Barrett Technology, Inc. under the trade designation "WAM" and includes Barrett Technology's "Gimbals" option. Further, the controller 5 is mounted at the remote or distal end of the arm through the gimbal to back drive it as a "master" arm that is operatively coupled to a like "slave" robotic arm, with the end effector EE mounted at its distal end.

Figure 3:
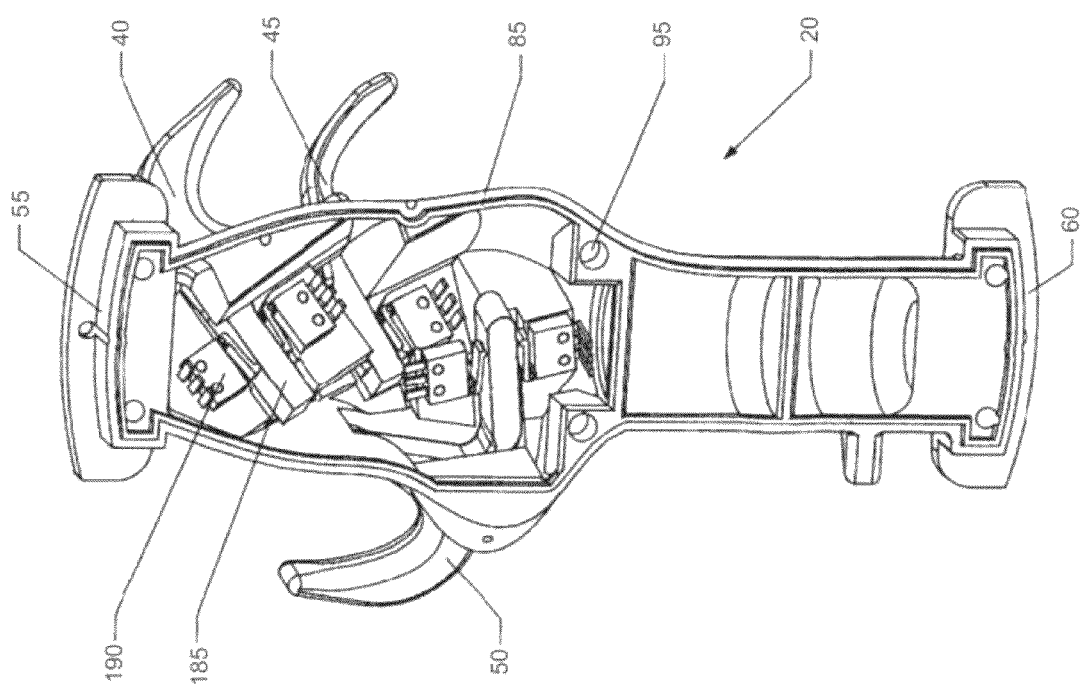
FIG. 3 is a perspective view of the inside of the front portion of the pistol-grip end effector controller.
Figure 5B:
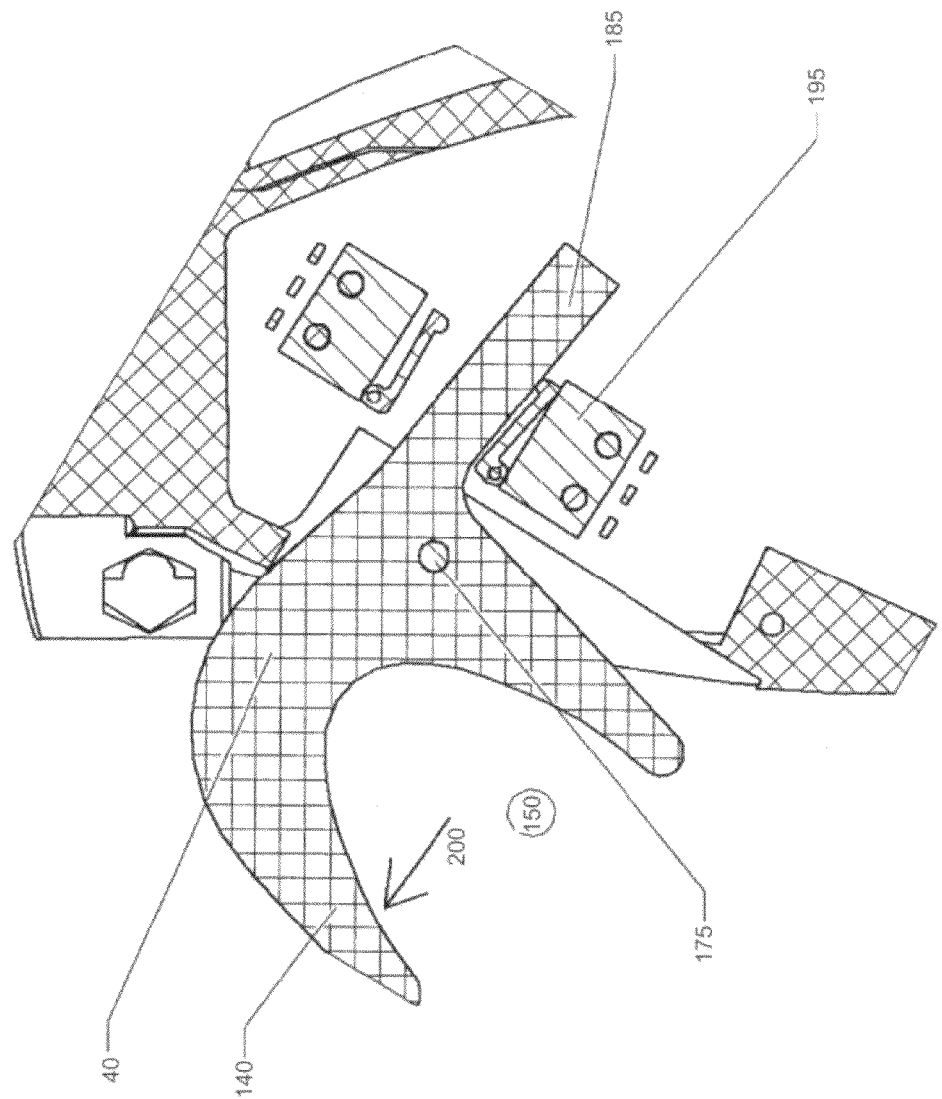
FIGS. 5B and 5C are views corresponding to FIG. 5A, but showing the switch trigger in two extreme positions to actuate two different internally-mounted electrical snap-action switches.
Figure 5C:
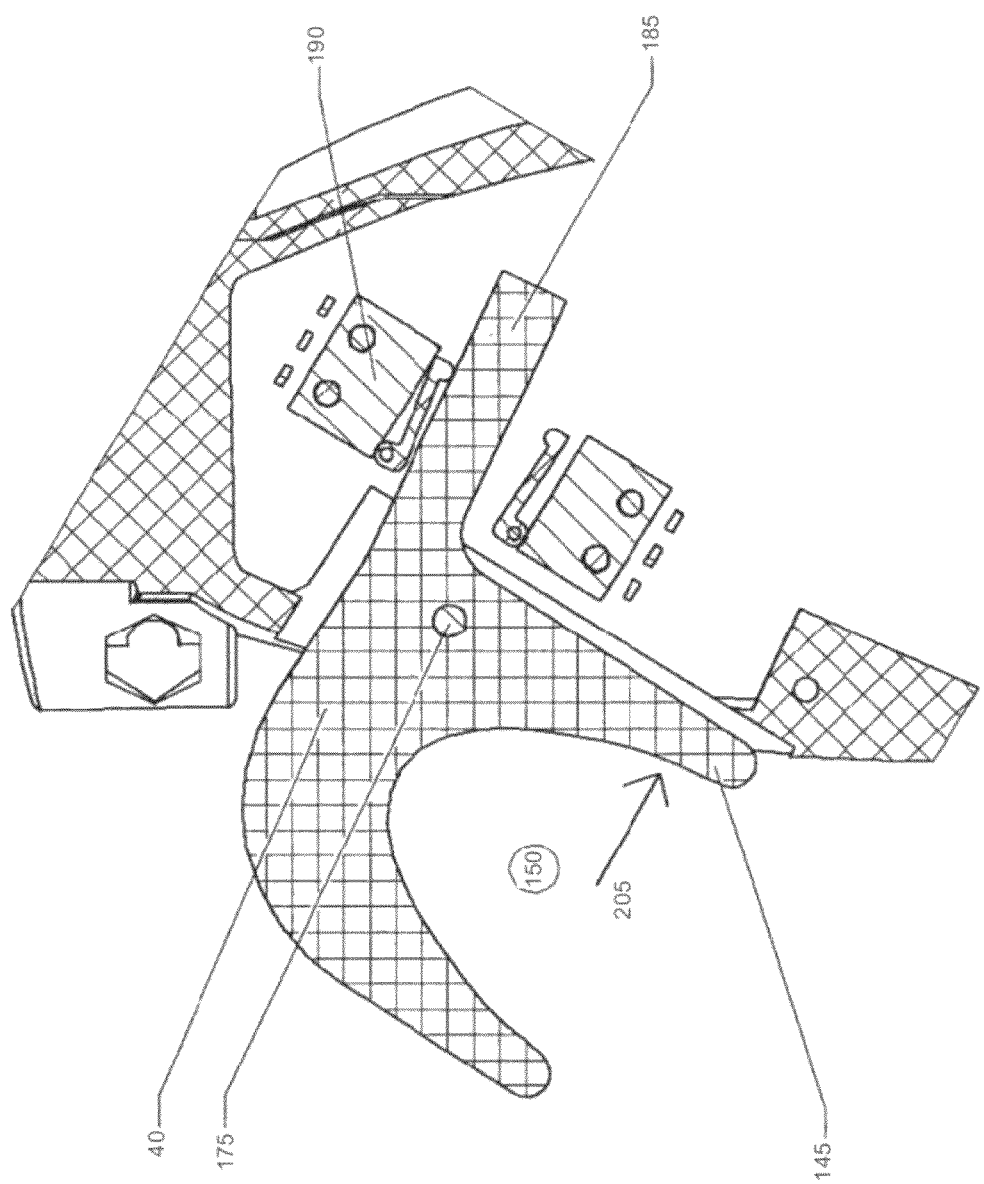
Figure 6:
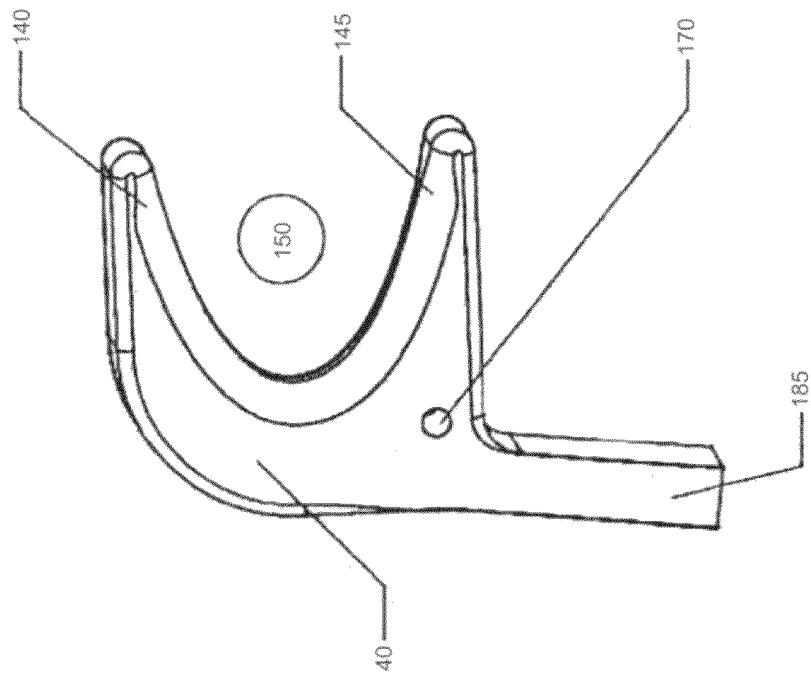
FIG. 6 is a perspective view of the switch trigger shown in FIGS. 5A-C.

Fasteners 75 (FIG. 1) and 80 (FIG. 1) further secure the controller to the support. The housing portions 20 and 25 are aligned with each other by a lip 85 (FIG. 3) and groove 90 (FIG. 4) along the perimeter of portions 20 and 25, respectively. The continuous, close alignment of the mated lip and groove ensures a smooth, continuous surface for the operator to grip. Fasteners 95 (FIG. 3) secure the portions 20 and 25 to one another.

The housing 30 has an outer ergonomic, generally pistol-grip shape that conforms to the natural shape of an operator's hand H (in phantom in FIG. 1). A bulbous protrusion 100 (FIG. 2) extends from smaller attachment points at the top end 55 and bottom end 60 of the controller in order to fit into the palm of the operator's hand. A smooth ridge 105 (FIG. 1) extends from the left side of the controller to support the operator's thumb in its natural orientation. A flat area 110

(FIG. 2) on the right side of the controller provides a resting surface for the operator's other fingers.

The switch triggers 35, 40, 45 and 50 mounted on the controller 5 are located to be easily-accessible and intuitively actuated by the operator's fingers. More particularly, the "C" or hook-shaped switch triggers 40, 45, and 50 are placed so as to be actuated by natural flexion and extension of the operator's fingers. A rocker switch 35 is placed so as to be easily actuated by the operator's thumb. The operator uses this rocker switch 35 to select among commonly-used orientations of the end effector peripherals as shown in FIGS. 7A-7D. A thumb wheel 115 (FIG. 2) is located so as to be easily rotated by the tip of the operator's thumb. This thumb wheel 115 is a fine-tuning knob to adjust the orientation (spread angle θ as shown in FIG. 8A of the end effector's fingers 15 between the commonly used modes. The thumb wheel 115 is operatively connected to two potentiometers 120, 125 mounted inside the housing, as shown in FIG. 4. A suitable potentiometer is sold by Panasonic as a single turn, continuous, surface mount unit.

The controller 5 of the present invention facilitates manipulation of the end effector 10 through rotations (roll, pitch, yaw) and displacements (x, y, z), produced by corresponding movement of the controller as a whole by the operator's hand, all without inadvertently actuating any of the switches. More specifically, the ergonomic outer shape of the controller affords gripping of the controller solely with the ball of the palm and the more proximal phalanges of the operator's fingers. This grip shape leaves the tips of the fingers to move freely and independently. They therefore do not apply pressure to the switch triggers 40, 45, and 50 as the controller as a whole is manipulated. The ability to move the controller 5 as a whole, through a corresponding physical manipulation of the controller 5 as a whole, independently of the state of activation of any of the switches mounted on the controller 5, is important in applications where the controller uses the orientation and location of the operator's hand to produce a like orientation and location of an end effector as a whole. An electrical connector 130 (FIG. 1) allows connection of an external wiring harness to pass electrical signals from the internal electronics to external peripherals. Wires internal to the controller 5 that connect the switches and other electrical components are not shown but will be readily understood by one skilled in the art. A hook feature 135 (FIG. 1) is used to secure and strain-relieve the external wiring harness.

The switch triggers 40, 45 and 50 are preferably open-ended "C" or hook-shaped as contemplated in a presently preferred form, one embodiment of which is illustrated in FIGS. 1-3, 5A-5C, 6 and 9A-9C. This configuration provides control of the peripheral (e.g., a robotic finger 15) of an end effector 10 such as a robotic hand. The switch 40, for example, has two opposed, curved faces 140, 145 (FIG. 5A) partially encircling a central recess 150 that receives the operator's pointer finger. The upper face 140, above the finger as shown, provides a surface for the operator's finger to press against to open (release) the fingers 155, 160 (FIG. 8A) and fixed finger 165 (FIG. 8A). The lower face 145, below the finger as shown, provides a surface for the operator's finger to press against to close (grip) the angular positions of the pivotable fingers 155, 160 and fixed finger 165. The partial encirclement of the operator's fingers allows for free movement of the fingers in donning and doffing the controller. The width of the recess 150 tapers (narrows through the closed end of the "C"-shaped recess) so that fingers of varying size can easily reach both the top and bottom faces.

A hole 170 (FIG. 6) through the center of the switching mechanism 40 accommodates a shaft 175 (FIG. 5A) about which the switch pivots. Holes 180 (FIG. 1) in housings 20 and 25 support shaft 175. A lever arm 185 (FIG. 5A) projecting inwardly from the external "C" or hook-shaped switch trigger portion acts alternately upon snap action, lever electrical switches 190 and 195 (FIG. 5A), e.g., of the type sold by Cherry. The hook-shaped switch is dual-acting in that a movement 200 (FIG. 5B) upwards of the finger of the operator against the face 140 actuates the snap action switch 195, and a movement 205 (FIG. 5C) downwards of the finger of the operator against the face 145 actuates the snap action switch 190. For example, when paired with a robotic hand end effector 10 shown in FIGS. 7A-7D, 8A and 10, the actuation of switch 195 sends a signal to command the robot finger 165 to open or release as shown in phantom finger 210 with motion 215 in FIG. 10, while actuation of switch 190 sends a signal to commands the robotic finger 165 to close as shown in phantom finger 220 with motion 225 in FIG. 10 (for one representative robotic finger 15).

When the switch trigger is actuated, to close, the associated robotic finger 15 will move in the closing direction, and continue to move until the robotic finger closes on an object, or reaches a preset "fully closed" position beyond that shown in FIG. 10, or the operator releases pressure on the face 145 of the trigger 40 to a degree that the snap action switch 190 is no longer activated. To open the finger 15, analogous motions and activations and deactivations occur, except that when opening the finger 15 is much less likely to encounter an object, but it can accidentally run into an obstruction. In short, the end effector robotic finger 15 only moves when one of the internal snap action, lever-arm-activated switches is activated.

The pivot shaft 175 and lever arm 185 allows the snap action switches 190 and 195 to be mounted inside the hollow shell 30. The lower face 145 is recessed in a shallow cavity 230 (FIG. 2) of the housing portion 20. Consequently, the lower face 145 follows the shallow curve of the housing in that area, preserving the ergonomic, hand-conforming shape of the controller.

The hook-shaped switches 45 and 50 are similar to switch 40 in functionality. The hooked-shaped trigger switches 40, 45 and 50 are not limited to the foregoing description. Some variations are illustrated in FIGS. 9A-9C.

A plurality of "C" or hook-shaped switch triggers may be mounted to the controller to facilitate independent control of several end effector peripherals. In the illustrated embodiment, three switches are shown, namely, a switch 40 for the index finger, a switch 45 for the middle finger, and a switch 50 for the thumb. Other embodiments, including two switches, four switches, or five switches, are also possible.

Because it is more comfortable for the operator if a finger extension motion encounters less resistance than the flexion motion, the pressure required to activate the switch mechanisms is adjustable. The snap action switches 190 and 195 may be interchanged with similar sized switches of increased or decreased mechanical resistance. Spring elements may also be added to the snap action switches to increase mechanical resistance. Regardless of the particular mechanical implementation, these arrangements make the amount of force required to actuate the switch mechanism in each direction different so as to more nearly equalize operator ease of opening and closing. Mechanically this arrangement creates a dual-action switching mechanism with a different actuation force for each direction of actuation.

The end effector 10 being controlled can have several different preset modes of operation. For example, with reference to FIGS. 7A-7D, 8A and 8B, the illustrated robotic hand may have preset configurations or spread angle modes 235 (FIG. 7A), 240 (FIG. 7B), 245 (FIG. 7C), and 250 (FIG. 7D). Each preset mode has different angular spread relationships between a fixed finger 165 and two pivotally movable fingers 155 and 160 that each pivot in a horizontal plane through a range of spread angles θ of 0° to 180° with respect to the finger 165. It is beneficial to have these commonly used configurations easily accessible because they each have advantages for grasping different shaped objects such as small, round, or handled objects. Using thumb switch 35, the operator toggles between the preset modes of the end effector. Depressing switch 35 in one direction will increase the spread of the fingers (e.g., from mode 235 to mode 240). Depressing it in the other direction will reduce the spread (e.g., from mode 240 to mode 235). The operator can turn knob 115 to make small adjustments around the preset modes. This also allows the operator to reach intermediate positions between the preset modes.

The controller 5 maps the switching mechanisms to different end effector peripherals based on the spread angle 255 (FIG. 8A) so the robotic peripherals respond more naturally to the inputs of the operator. For example, when the end effector is in mode 235 (FIG. 7A), switches 40, 45, and 50 control the opening and closing of fingers 165, 155, and 160, respectively. This is mapping scheme 1. When the end effector is in mode 250 (FIG. 7D), the switches 40, 45, and 50 control the opening and closing of fingers 155, 160, and 165, respectively. This is mapping scheme 2. In this manner, the robotic peripherals (i.e., fingers 155, 165, 160) visually correlate to the operator's fingers. The controller 5 of this invention thus functions under either mapping scheme 1 or 2 to make it more intuitive for the operator to control the end effector fingers. A hysteresis zone 260 (FIG. 8B) in the spread angle 255 (FIG. 8A) determines the switching point between mappings. This hysteresis zone occurs between modes 240 (FIG. 7B) and 245 (FIG. 7C). This hysteresis prevents the mapping from changing several times when the operator is finely adjusting around a given spread angle 255.

The foregoing mode presets, mappings and hysteresis zone are preferably implemented in software on the computer in the "master" and "slave" WAM arms that support the controller 5 and end effector 10. Additional preset modes can be added easily, or modified.

In the preceding sections of this document, the controller 5 is discussed in the context of controlling movement of a robotic end effector 10. However, it should be appreciated that controller 5 can also be used to control other devices as well, and/or to input control commands to other devices and/or systems. By way of example but not limitation, controller 5 can be used as a game controller for a video game, or as a flight controller for a drone aircraft, or as a flight controller for a guided missile, etc. In essence, controller 5 can be used as a controller for substantially any application where the hand and finger movements of an operator need to be sensed and converted into corresponding signals which are then used as an control input for a device and/or system.

While the foregoing written description of the invention enables one of ordinary skill in the art to make and use what is considered presently to be the best mode thereof, those of ordinary skill in the art will understand and appreciate the existence of variations, combinations, and equivalents of the specific embodiment, method, and examples herein. The invention should therefore not be limited by the above described embodiment, method, and examples, but by all embodiments and methods within the scope and spirit of the present invention.

What is claimed is:

1. A method for remotely controlling a robotic end effector having movable peripherals, the method comprising:
   providing an end effector controller that is gripped by an operator in one hand, the end effector controller comprising a pistol-grip housing configured to fit in the palm of the operator's hand when gripped, the end effector controller further comprising:
   at least three finger-actuated switching mechanisms for actuating a like number of peripherals on the end effector, wherein each finger-actuated switching mechanism is associated with a specific peripheral on the end effector, and further wherein each finger-actuated switching mechanism is configured so that movement of a selected finger-actuated switching mechanism causes a corresponding movement of the associated peripheral; and
   a finger-actuated mode selector for selecting between a plurality of preset operating modes, wherein each preset operating mode places the peripherals of the end effector in a different pre-determined configuration;
   using the finger-actuated mode selector to select a preset operating mode of the end effector so as to place the peripherals of the end effector in the pre-determined configuration associated with the selected preset operating mode; and
   actuating at least one finger-actuated switching mechanism so as to move the peripheral associated with the finger-actuated switching mechanism.

2. A method according to claim 1 wherein additional preset operating modes can be added to the controller.

3. A method according to claim 1, further comprising using the finger-actuated mode selector to switch between preset operating modes, wherein said switching between preset operating modes commands the end effector to the nearest preset operating mode when actuated.

4. A method according to claim 1, further comprising remapping of the finger-actuated switching mechanism associated with a peripheral to a different peripheral.

5. A method according to claim 4 wherein remapping occurs between selecting between different preset operating modes.

6. A method according to claim 5 wherein said remapping includes a hysteretic zone to govern the transition between remapping.

7. A method according to claim 1 wherein the method further comprises providing continuous fine adjustment between preset operating modes using a control input element.

8. A method according to claim 7 wherein the control input element comprises a rotatable knob.

9. A method according to claim 1 wherein the method further comprises mapping the finger-actuated switching mechanisms to the associated peripheral of the end effector based on the selected preset operating mode.

10. A method according to claim 1 wherein said controller is moved as a unit to cause corresponding manipulation of the end effector without the actuation of any of the finger-actuated switching mechanisms.

11. A method according to claim 1 wherein each finger-actuated switching mechanisms has (i) a hook shape that receives one finger of the operator to allow for convenient donning and doffing of the controller by the operator's hand; and (ii) a lever arm extending into said housing, and further wherein the controller further comprises an electrical switch mounted to the housing for operatively coupling with the lever arm.

12. A method according to claim 11 wherein said electrical switch is two opposed switches.

13. A method according to claim 12 wherein said opposed electrical switches are different so as to create different resisting forces.

14. A method according to claim 12 wherein said opposed electrical switches are positioned within the housing so as to create different resisting forces.

15. A method according to claim 12 wherein said lever arm is connected to said housing via one or more spring elements to create different resisting forces.

16. A method according to claim 12 wherein said opposed electrical switches are operatively connected to said lever with varying resistances so as to create different resisting forces.

17. A method according to claim 1 wherein the finger-actuated mode selector comprises a thumb switch.

18. A method for remotely controlling a device, the method comprising:

provide a device controller that is gripped by an operator in one hand, the device controller comprising a pistol-grip housing configured to fit in the palm of the operator's hand when gripped, the device controller further comprising:

at least three finger-actuated switching mechanisms for actuating a like number of peripherals on the device, wherein each finger-actuated switching mechanism is associated with a specific peripheral on the device, and further wherein each finger-actuated switching mechanism is configured so that movement of a selected finger-actuated switching mechanism causes a corresponding movement of the associated peripheral; and a finger-actuated mode selector for selecting between a plurality of preset operating modes, wherein each preset operating mode places the peripherals of the device in a different pre-determined configuration;

using the finger-actuated mode selector to select a preset operating mode of the device so as to place the peripherals of the device in the pre-determined configuration associated with the selected preset operating mode; and actuating at least one finger-actuated switching mechanism so as to move the peripheral associated with the finger-actuated switching mechanism.

\* \* \* \* \*